United States Patent [19]

Yong-Je et al.

[11] Patent Number: 5,016,106

[45] Date of Patent: May 14, 1991

[54] IMAGE SIGNAL PROCESSING CIRCUIT FOR PRODUCING MULTIPLE PICTURES ON A COMMON DISPLAY SCREEN

[75] Inventors: Kim Yong-Je, Kyoungsangnam-do, Rep. of Korea; Hoon-Sun Choi; Dae-Yoon Sim, both of Seoul, all of Rep. of Korea

[73] Assignee: SamSung Electronics Co., Ltd., Maetan-Dong, Rep. of Korea

[21] Appl. No.: 359,129

[22] Filed: May 31, 1989

[30] Foreign Application Priority Data

Jul. 8, 1988 [KR] Rep. of Korea ............... 1988-8465

[51] Int. Cl.$^5$ ................. H04N 5/262; H04N 5/268; H04N 9/74
[52] U.S. Cl. ........................... 358/183; 358/182; 358/22; 358/181
[58] Field of Search ................ 358/183, 182, 22, 187

[56] References Cited

U.S. PATENT DOCUMENTS

| | | | |
|---|---|---|---|
| 4,729,027 | 3/1988 | Hakamada et al. | 358/183 |
| 4,729,028 | 3/1988 | Micic et al. | 358/183 |
| 4,814,884 | 3/1989 | Johnson et al. | 358/183 |
| 4,835,613 | 5/1989 | Johnson | 358/183 |
| 4,855,833 | 8/1989 | Kageyama et al. | 358/183 |

Primary Examiner—John K. Peng
Attorney, Agent, or Firm—Keon-Joo Lee; Chul Rhee; Robert E. Bushnell

[57] ABSTRACT

There is disclosed an image processing circuit for displaying a plurality of sub-pictures which have different image signal sources on a common screen. The inventive subject digitalizes an original image analog signal by use of a corresponding sampled signal upon a multiple picture processing, saves the digitalized data almost simultaneously, and uses a dual-port memory for reading the data, whereby the circuit simplifies the generating process of a control timing signal and renders the PIP process easy to carry out, when controlling the dual-port memory by read-write operation. The apparatus for carrying out the invention includes a keyboard or remocon for data input/output, a microcomputer for controlling the entire process, a controller for controlling display processes, an analog switching device, an A/D converter for converting the analog signal to a digital signal, a dual-port memory for dealing with various image signals, and three D/A converters for converting digital data to analog data.

44 Claims, 6 Drawing Sheets

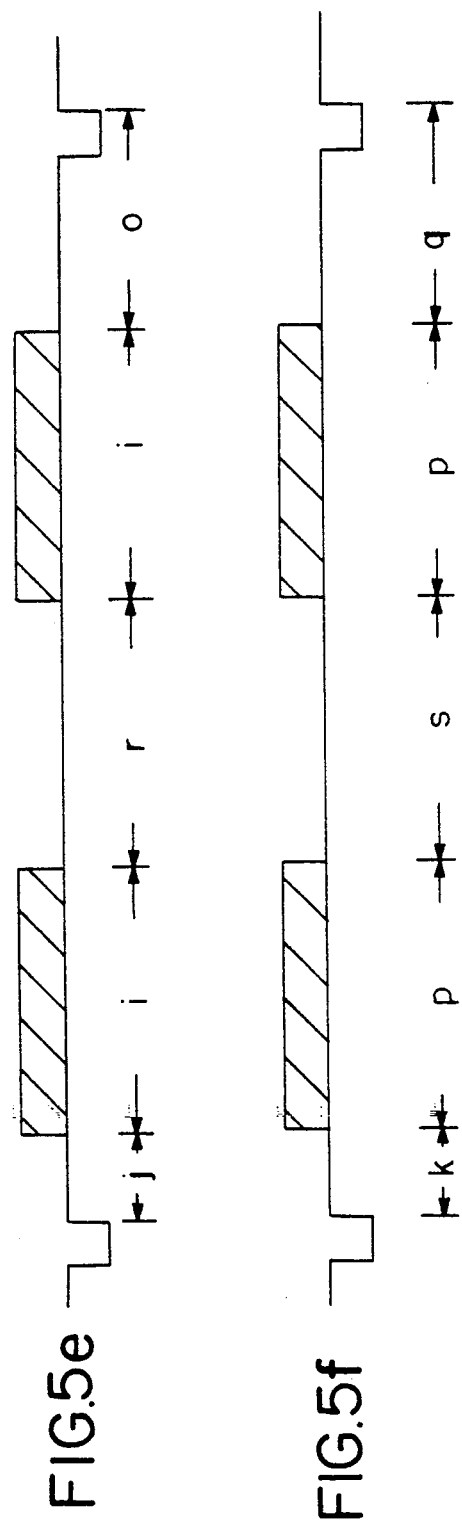

IMAGE SIGNAL PROCESSING CIRCUIT FOR PRODUCING MULTIPLE PICTURES ON A COMMON DISPLAY SCREEN

BACKGROUND OF THE INVENTION

The present invention relates to a picture-in-picture (hereinafter referred to as PIP) television set and a video tape recorder, and more particularly, to a image processing circuit capable of producing multiple pictures simultaneously on a common display screen.

Generally, in a PIP display, a B-channel picture (hereinafter referred to as sub-picture), being inserted at a predetermined area of an A-channel picture (hereinafter referred to as main picture), is displayed at a size corresponding to that of one-ninth of main picture. Such image processing techniques, which display main picture and sub-picture from different image sources respectively on one display screen, are applied to television and VTR systems.

Each VT and TVR maker applies specific format for a PIP system, and the PIP processing systems have different properties from one another in accordance with each specific format. For example, some processing systems use a method which samples both the main picture signal and the sub-picture signal simultaneously to convert those to digital data, while the other processing systems use a method which converts only the sub-picture to digital data. Additionally, there is disclosed the method of displaying within the main picture a small picture having a different picture source from the main picture. However, by the remarkable progress of PIP technique, a technique which displays simultaneously the multiple different pictures has been disclosed. In addition, there is disclosed another prior art which displays two sub-pictures simultaneously in a main picture, whereby one of the two pictures is a still picture while the other is a moving picture.

In the beginning techniques for displaying the multiple pictures disclosed recently, the PIP system includes four sets of a PIP controller, a line memory and a field memory respectively, and displays the picture on the screen by a write control signal of the controller during the reading process of the image signal.

This method is already a widely-known technique, which samples sequentially B−Y, R−Y and Y signals. In this processing method, since the line memory and the field memory are constituted separately, the control methods thereof are also independent of each other. Accordingly, the image data can be written and read respectively. Therefore, in the above-mentioned conventional method, since each of the line memory and the field memory is controlled independently each of other, the control timing signals must be produced effectively to control the memories. In attaining the goal, there has been a problem in which the construction of the circuit becomes complicated and raises the production cost of the system employing this known method.

SUMMARY OF THE INVENTION

It is accordingly an object of the present invention to provide a circuit for digitalizing an original image analog signal by use of a corresponding sampled signal during multiple picture processing, saving the digitalized data almost simultaneously, and using a dual-port memory for reading the data, whereby the circuit simplifies the process of generating a control timing signal and renders the PIP process easy to carry out, when controlling the dual-port memory by read/write operation.

It is another object of the present invention to provide a circuit capable of producing multiple pictures.

According to one aspect of the present invention, a image processing circuit for displaying a plurality of sub-pictures having different image signal sources on a common screen includes a keyboard or remocon means for data input/output, a microcomputer for controlling the entire process, a controller for controlling displaying process, an analog switching device for selecting a luminance signal and color difference signal from the controller, an A/D converter for converting the analog signal into a digital signal, a dual-port memory for dealing with various image signals, and first, second, and third D/A converters for converting digital data to analog data.

BRIEF DESCRIPTION OF THE DRAWINGS

The foregoing and other objects as well as advantages of the present invention will become clear by the following description of the present invention with reference to the accompanying drawings, wherein:

FIGS. 5a-5f are diagrams representing the reading and writing of multiple pictures according to the present invention.

DETAILED DESCRIPTION OF THE PREFERRED EMBODIMENT

The invention will now be described in detail with reference to the drawings.

Figure 1:
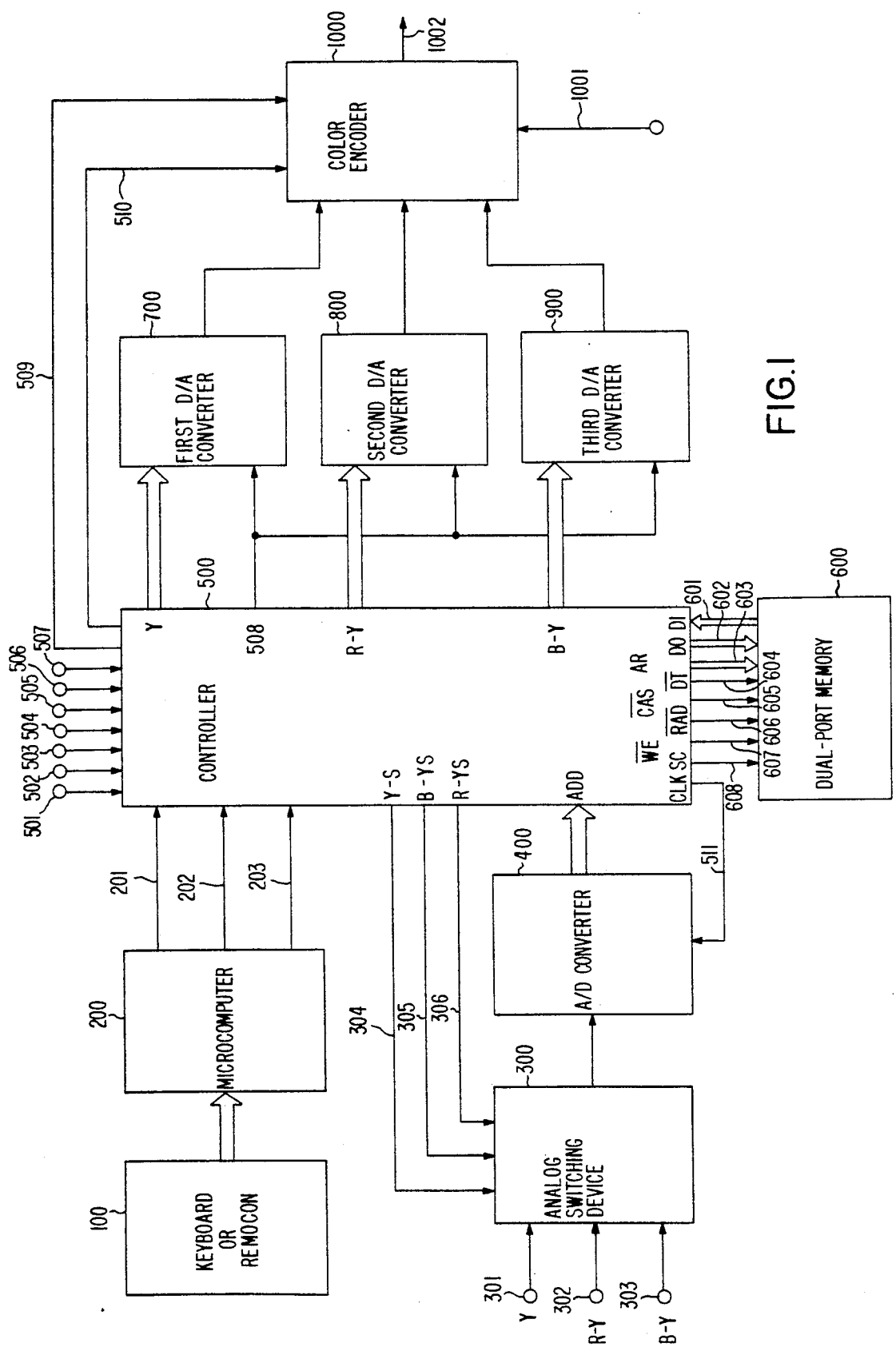
FIG. 1 is a block diagram illustrating schematically an image signal processing circuit according to the present invention.

FIG. 1 is a block diagram illustrating schematically an image signal processing circuit according to the present invention. A keyboard or remote controller (i.e., a remocon) 100 is capable of inputting an instruction word of the multiple picture mode established an user. A microcomputer 200 checks the instruction word for processing the multiple picture inut through said keyboard or remocon 100, produces the clock and data for processing the multiple pictures through the lines 201 and 202, and recognizes whether the data is effective or not by the data received through a strobe line 203.

A controller 500 receives through the lines 503-506 the vertical and horizontal synchronizing signals of the main picture and sub-pictures from a synchronizing separator (not shown) for the video signal and receives a first and a second reference frequency produced in the oscillator through the lines 501 and 502, thereby to control the displaying of the multiple pictures on a monitor by the data from microcomputer 200. An analog switching device 300 selects and inputs the luminance signal Y and color difference signals B−Y and R−Y from lines 301 and 303 in the sequence of R−Y→Y→Y→B−Y→Y→Y by the switching signals for selecting luminance signal Y and color difference signals B−Y and R−Y from lines 304–306 of the controller.

An analog/digital converter 400 converts the output data of the analog switching device 300 into digital data by the signal of the clock terminal CLK in the A/D converter, wherein the signal is from the controller 500. A dual-port memory 600 provided with two ports of input/output terminals accessable independently from each port bidirectionally, outputs the signals of $\overline{DT}$, $\overline{CAS}$, $\overline{RAS}$, $\overline{WE}$ and SC through the lines 604–608 connected with the controller 500 in response to the vertical and horizontal synchronizing signals of the main picture and the sub-picture, the address signal being produced to a line 603, stores and reads the video signal digitized by said analog/digital converter 400 through the data lines 603 and 602 of the access ports in accordance with the window of the designated multiple picture, and outputs the corresponding video data to the serial port by the control signal at the random port from controller 500.

A first, a second and a third D/A converter 700, 800 and 900 divides the digital data from dual-port memory 600 into the luminance signals and the color difference signal in accordance with the D/A conversion sampling produced from controller 500, thereby converting the data into an analog signal; and color encoder 1000 encodes, by the sub-picture position determining signal and the pedestal clamping signal of the composite synchronizing signal through lines 509 and 510 of controller 500, the digital signal produced in first, second and third D/A converters 700, 800 and 900 with the main picture video signal, thereafter to display it in the form of a multiple picture.

Figure 2:
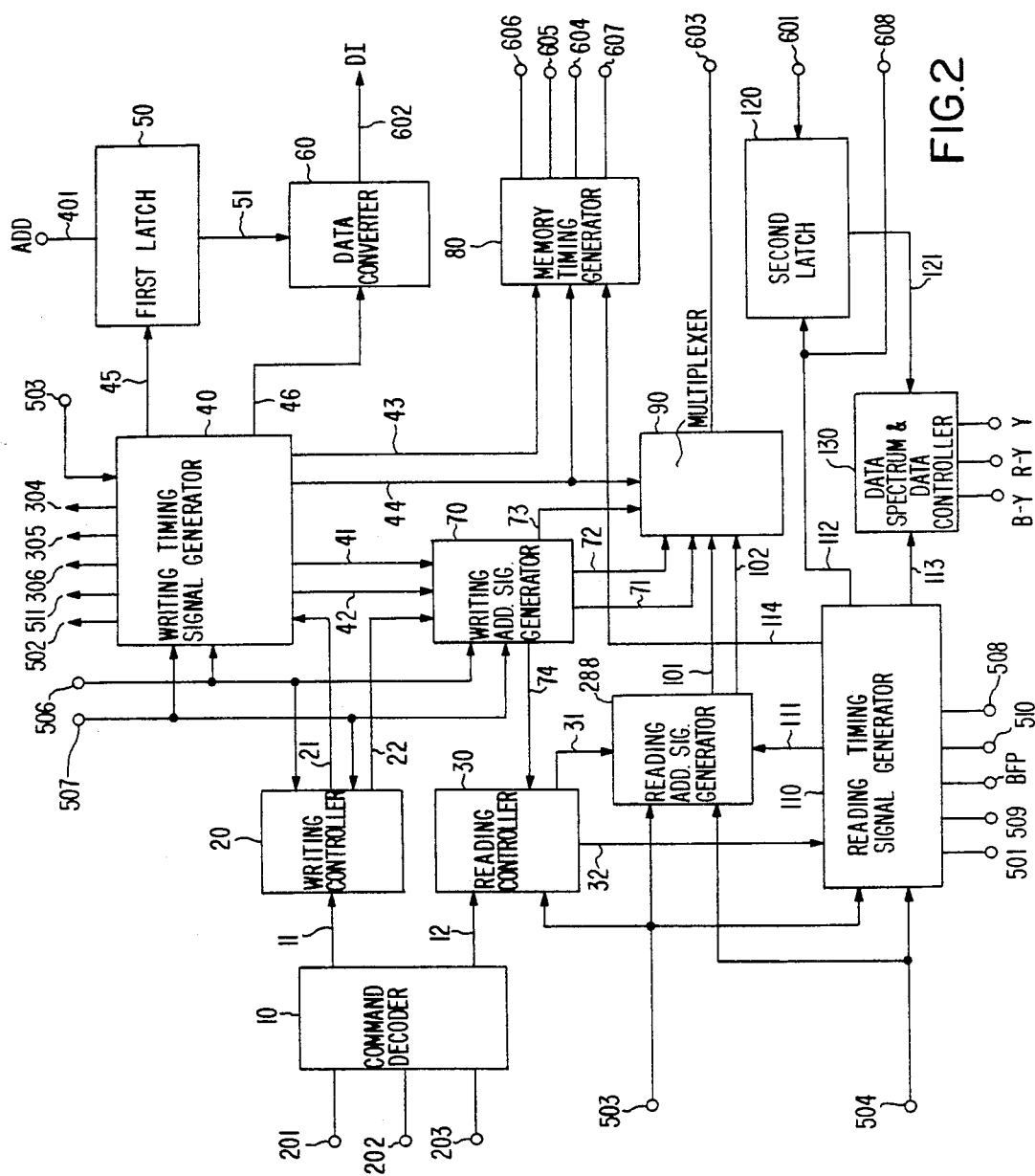
FIG. 2 is a specific block diagram illustrating in more detail a controller of FIG. 1 according to the invention.

FIG. 2 is a specific block diagram illustrating in more detail the controller of FIG. 1 according to the invention. A command decoder 10, connected with said microcomputer 200 through lines 201–203, decodes the data from said microcomputer 200 to identify if it is the multiple picture selecting signal, thereby producing the control signal for performing the read/write function according to said identification; a writing controller 20, connected with said command decoder 10 through a line 11, produces the writing control signal by the picture selecting information produced from the command decoder 10 and vertical/horizontal synchronizing signal of the sub-picture input through lines 506 and 507.

A writing timing signal generator 40 uses the picture producing timing control signal from writing controller 20 for determining the desired number of the pictures and performing the various sub-functions, and uses a first reference signal and the sub-picture vertical/horizontal synchronizing signals at lines 506 and 507, thereby to generate the column, refresh clock of dual-port memory 600 and the luminance YS and color B−YS, R−YS switching signals through lines 304, 305 and 306 which are required in switching device 300 shown in FIG. 1, generates the sampling clock signal for converting the signal into the digital data required in said analog/digital converter 400, generates the clock signal for converting the "m" bit data requested in dual-port memory 600 and the latch clock required for latching the output data in analog/digital converter 400, and generates all clock signals produced when writing the sub-picture data.

A first latch 50 latches the digital data through a line ADD (i.e., lead 401 as shown in FIG. 1) from the analog/digital converter 400 by the timing clock signal through a line 45 coupled to writing timing signal generator 40. A data converter 60 converts the digital data received via lead 51 into the corresponding "m" bit data suitable for the processing characteristics of dual-port memory 600 in accordance with the data converting clock from said writing timing signal generator 40 via lead 46.

A writing address signal generator 70 uses the input signals received through the input lines 506 and 507 of said sub-picture vertical/horizontal synchronizing signals and the control signal at line 22 of said write controller 20, and uses the column and refresh clocks produced from the writing timing signal generator 40, thereby to generate the column and row signals for writing the image data and thereafter address signals for refreshing the memory.

A multiplexer 90 selects the column and row address signals and the address signal for memory refreshing at lines 71–73 from said writing address signal generator 70 by the control signals produced from said writing timing signal generator 40, thereby to select the memory refreshing address, the image data writing signal and output address signals for processing the multiple pictures in said dual-port memory 600. A memory timing generator 80 generates the $\overline{RAS}$, $\overline{CAS}$, $\overline{DT}$ and $\overline{WE}$ control signals required in said dual-port memory 600 by the timing clock for memory and the control signal for memory processing generated in said writing timing signal generator 40.

A reading controller 30 receives the address signals for choosing the memory area from said writing address signal generator 70 via lead 74, and receives from said command decoder 10 the read control signal indicating that the picture information exists in said dual-port memory 600 thereby to produce the reading control signal by the vertical synchronizing signal of the main picture produced through the line 503. A reading timing signal generator 110 receives the first reference signal $(a=f_{sc})$ $(a>0)$, and inputs the main picture horizontal synchronizing signal and the position information of identifying signal produced from said reading controller 30 to logicalize these signals, and thereafter to generate the clock for the digital/analog conversion, the window control signal and BFP signal produced through lines 501, 508–510 and BFP.

A reading address signal generator 288 uses the position information signal representing the position of the small a picture-in-picture for to be displayed through line 111 connected with reading timing signal generator 110 and the main picture horizontal synchronizing signal input through the line 504, and uses the enabling signal for starting to read out from the read controller 30 to logicalize said input signals, thereby generating the address signal for reading the image data; a second latch 120 latches the data from said dual-port memory 600 by the signal output from said reading timing signal generator 110.

A data spectrum and data controller 130 converts the data received from second latch 120 via lead 121 into the format corresponding to the order of B−Y, R−Y and Y outputted said second latch 120 according to the signal received via lead 113 from said reading timing signal generator 110.

Figure 3A:
FIGS. 3a-3c are timing charts of the multiple picture selecting output data from a microcomputer according to the present invention.
Figure 3B:
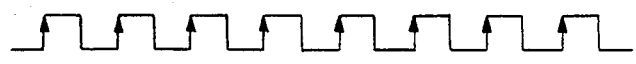
Figure 3C:
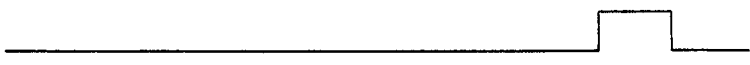

FIG. 3 is a timing diagram for the picture selection produced in a microcomputer 200 according to the present invention, wherein 3a represents a waveform of data at line 201 connected with the microcomputer 200, 3b represents a waveform of data clock signal at line 202 connected with the microcomputer 200, and 3c represents a waveform of a strobe signal at line 203 connected with the microcomputer 200.

FIG. 4 represents waveforms of the switching signals of an analog switching stage 300 of FIG. 1 according to the present invention and of the A/D converting clock signal at line 511 shown in FIG. 1, wherein 4a represents a waveform of a luminance switching signal at line 304, 4b represents a waveform of a R−Y switching signal at line 306, 4c represents a waveform of a B−Y switching signal at line 305, and 4d represents a waveform of a clock signal for converting an analog signal into a digital signal.

FIG. 5 is a diagram representing the reading and writing of the multiple pictures in accordance with the present invention, wherein 5A is a view of an example illustrating a section where the sub-picture is written, 5B is a view of an example illustrating the position where the sub-picture is read, 5C is an illustration representing the written position in which the sub-picture is displayed on the basis of a sub-picture vertical synchronizing signal, 5D is an illustration representing the section to be written in which the sub-picture is displayed on the basis of a sub-picture horizontal synchronizing signal, 5E is an illustration representing the positions where the sub-pictures are displayed on the basis of the sub-picture vertical synchronizing signal, 5F is an illustration representing the positions where the sub-pictures are displayed on the basis of the sub-picture horizontal synchronizing signal.

FIG. 6 is a specific diagram for a timing that is requested in a color encoder 1000 according to the present invention. Accordingly, an embodiment of the present invention will be explained in detail with reference to FIGS. 1 to 6. In order to produce the sub-picture within the main picture on a common screen in a video receiver system such as TV and VTR, a user pushes a sub-picture selecting key through a keyboard or remocon 100. And then the microcomputer 200 decodes the command key from said keyboard or remocon 100, thereby to identify whether it is the information for selecting the multiple pictures. When the information for selecting the multiple pictures is identified the microcomputer 200 produces the data and the control clock signals in form of the waveforms shown in FIG. 3 to input those through the lines 201-203 to a controller 500. A command decoder 10 in the controller 500 of FIG. 2 receives the data through the line 201, but latches the data line 201 by the clock signal at line 202.

The strobe signal at line 203 allows the controller to identify whether the input data of line 201 is the effective data. Accordingly, this is like the command decoder 10 decodes the data to identify if the system is in an "on" state in order to process the sub-picture. And command decoder 10, which controls the dual-port memory 600 to read and write the data, specifies the 1 byte as the predetermind bit to produce the multiple picture selecting information by changing of the flag, and this signal is at line 11 to the write controller 20.

When writing the PIP and the multiple pictures, the write controller 20 generates, by the sub-picture vertical and horizontal synchronizing signals of lines 506 and 507 and the picture selecting information produced in command decoder 10, the timing signal for processing the multiple pictures to input this signal through a line 21 to a writing timing signal generator 40. If this is input to a writing address signal generator 70 by using the predetermined high-order bits produced through a line 22, this signal becomes the memory high-order address for the sub-picture writing processing to input to the address for selecting the area of the dual-port memory 600. Writing timing signal generator 40 receives the sub-picture vertical/horizontal signal through the lines 506 and 507, and inputs the second reference signal ($b=f_{sc}$) through a line 502 to output the memory column clock signal through a line 41 by said vertical synchronizing signal preferentially.

Figure 4A:
FIGS. 4a-4d represent waveforms of the switching signal of an analog switching stage and of the A/D converting clock signal at a line of FIG. 1 according to the present invention.
Figure 4B:
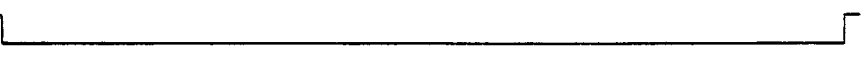
Figure 4C:
Figure 4D:

The memory timing generator 80 generates the writing timing signal for processing the sub-picture by the control signal produced through a line 44 and the memory timing clock signal produced through a line 43. The second reference signal ($b=f_{sc}$) enables the switching signal to be generated so that the color difference signal R−Y and B−Y and the luminance signal Y as shown in FIG. 4a–4c are selected to be input through the lines 304–306. Further, said generated switching signal is inputted to the analog switching means of FIG. 1. In addition, the A/D clock as shown in FIG. 4d is generated to be input through line 511 to the analog/digital converter 400 of FIG. 1.

In FIG. 1, when line 304 is logic high, the analog switching means 300 transmits the luminance signal Y to the analog/digital converter 400, and by the A/D clock which is produced through the line 511 connected with the writing timing signal generator 40, the analog luminance signal is digitized into K(K>0) bits.

Likewise, the color difference signals R−Y and B−Y take the process as described above by the switching signal through the lines 305 and 306, and the timing of the switching signal is represented in FIG. 4b and 4c. Namely, the sequence of sampling is repeated in order of R−Y, Y, Y, B−Y, Y, and Y. The digitized data of K bits are signal the first latch 50 of FIG. 2, so that those are latched by the clock signal through a line 45 connected with the writing timing generator 40. Latched data of "K" bits should be converted in the form of the data format of the dual-port memory 600, thereby to be written in the dual-port memory 600, and then said data conversion is performed by data converter 60 so that the data is converted into the "m" (m>0) bits to be conformed with the data format of the dual-port memory 600 by the data converting clock generated in said writing timing signal generator 40.

In the meanwhile, by the control signal through the line 22 connected with the writing controller 20, the memory row addresses to be used in the dual-port memory 600 are produced to be input to the writing address signal generator 70. These address signals become of the high-order X bits (X>0) of addresses in the dual-port memory 600. In the writing address signal generator 70, the high-order X bits and the low-order Y bits (Y>0) are generated by the sub-picture horizontal synchronizing signal input through the line 506, thereafter to become the row addresses requested in the entire dual-port memory 600. These signals are input into the multiplexer 90. The column clock signal is generated to count the column address through the line 41 connected with the writing timing signal generator 40, so that it is transmitted to writing address signal generator 70. The writing address signal generator 70 generates the column address signal into the dual-port memory 600 to be written during the period of the sub-picture horizontal synchronization by utilizing the column clock. Said generated column addresses are input into multiplexer 90.

Furthermore, the memory timing clocks, which are supplied from the line 43 of the writing timing generator 40, are input to the memory timing generator 80. Memory timing generator 80 generates the $\overline{RAS}$, $\overline{CAS}$, $\overline{WE}$ and $\overline{DT}$ signals using memory timing clocks to supply those through the lines 604-607 to the dual-port memory 600. The writing row column address from multiplexer 90 selects the address to be output to line 603 by the output control signal of the line 44, address being generated from the writing timing signal generator 40. In the memory timing generator 80, the row, column addresses and the control signals ($\overline{RAS}$, $\overline{CAS}$, $\overline{WE}$ and $\overline{DT}$) are generated by the control signal generated from the writing timing signal generator 40 so that those are supplied to the dual-port memory 600.

In FIG. 5, the sub-picture writing position is shown, wherein, in the sub-picture video one field section, after the period that "e" has elapsed from the rising edge of the sub-picture vertical synchronizing signal, the data sampling is started. Subsequently, the data sampling is performed for the time "t", so that the sampled data is written in the memory. Thereafter, data is not written for the f period. That is, the writing position can be well represented as shown in FIG. 5C. Further in view of the sub-picture horizontal synchronizing period, after the period of g has elapsed from the rising edge of the sub-picture horizontal synchronizing signal, the sampling and writing of the data are started. Subsequently, the data sampling is performed for the time "u", thereafter to write the sampled data, and this writing of data is not performed for the period "h".

Figure 5A:
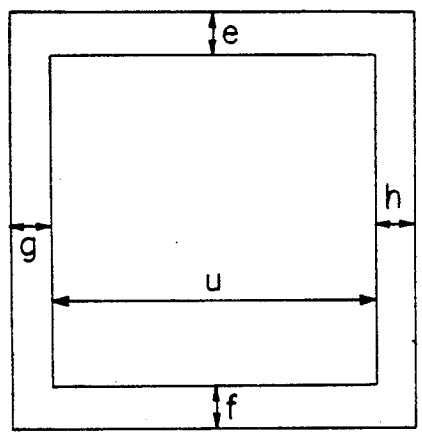
Figure 5B:
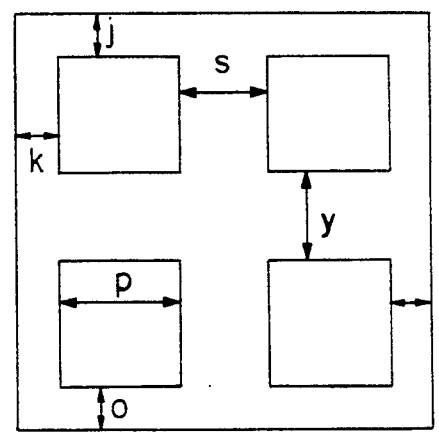
Figure 5C:
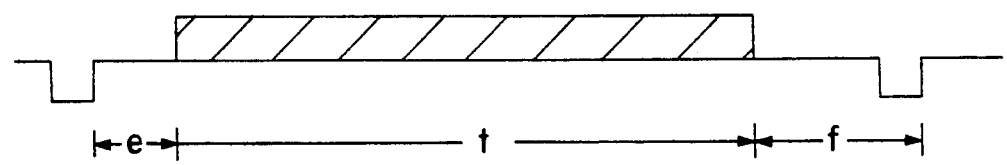
Figure 5D:
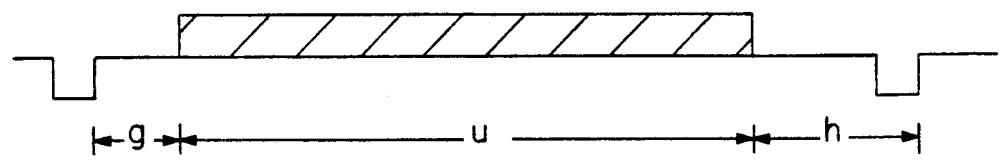
Figure 6A:
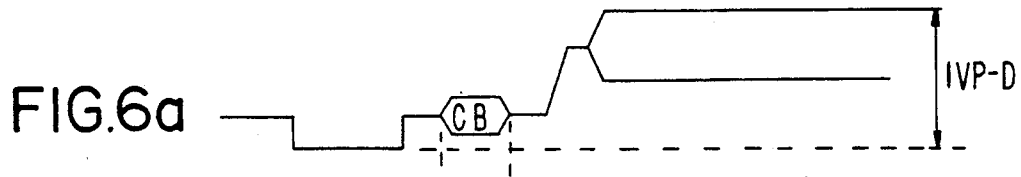
FIGS. 6a-6i are specific diagrams for a timing that is requested in color encoder according to the present invention.
Figure 6B:
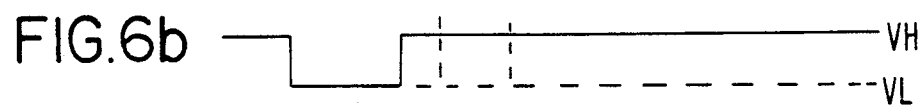
Figure 6C:
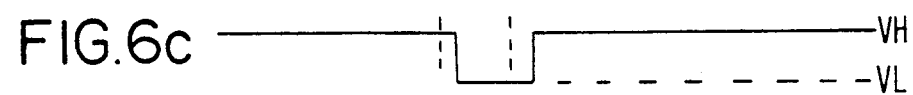
Figure 6D:
Figure 6E:
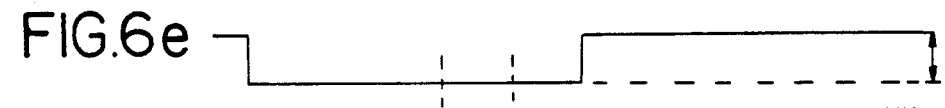
Figure 6F:
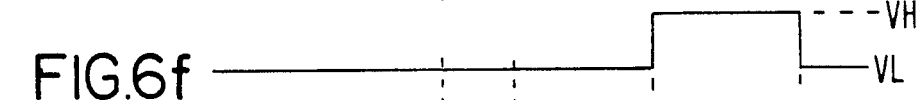
Figure 6G:
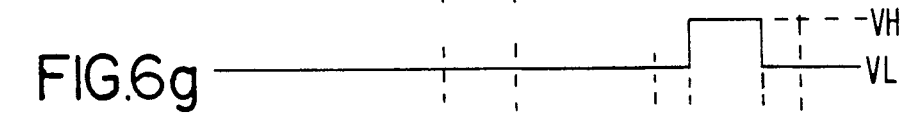
Figure 6H:
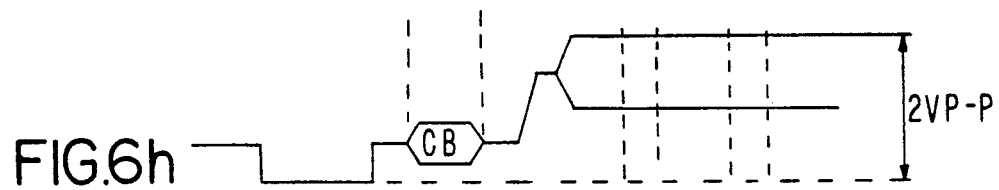
Figure 6I:
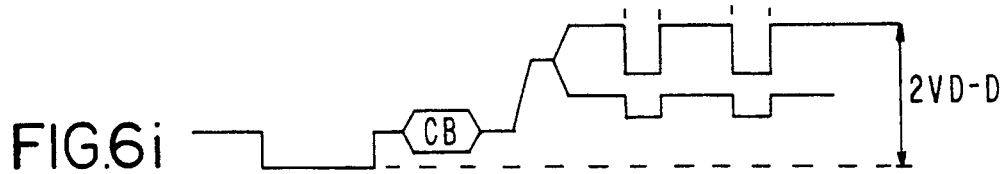

The relationship of this example can be represented as shown in FIG. 5D. In using dual-port memory 600, the writing and reading are performed simultaneously. If the sub-picture enable signal is input in form of signal as shown in FIG. 3a, the writing is performed as described above, and the reading is performed in the following manner. In case that the data, which is input from the microcomputer 200 to the command decoder 10, is the sub-picture enable signal, this signal is supplied through line 12 to the reading controller 30. In reading controller 30, after a plurality of vertical synchronizing signals of the main picture, the row address starting point of the dual-port memory 600 is produced so as to read the data for displaying on the sub-picture area from the dual-port memory 600. When the row address starting point is input to the reading address signal generator 288, the reading address signal generator 288 generates the address signal of the dual-port memory 600, the address signal being required for the reading by the picture position information signal from the read timing signal generator 110 and the main picture horizontal synchronizing signal on line 504.

Meanwhile, in the generated address signal, the reading address is selected in response to the control of the reading timing signal generator 110 which inputs the first reference frequency (a fsc) signal received through the line 501 and the main picture vertical synchronizing signal and the main picture horizontal synchronizing signal received through the lines 503 and 504, thereby to generate the timing required for the data reading. And the reading timing signal generator 110 generates through the lines 508-510 and BFP the D/A clocks of the first, second and third digital/analog converters 700, 800 and 900 of FIG. 1, the YS signal indicating the position where the sub-picture is to be screened, the BFP signal being the main picture video burst flag pulse required in the color encoder 1000, and the PCLMP being the main picture pedestal clamping pulse. This timing relationship is represented in FIG. 6.

Therefore, the reading timing signal generator 110 produces the $\overline{DT}$ signal which is required for reading the data from the dual-port memory 600 to supply through the line 114 to the memory timing generator 80. The memory timing generator 80 produces the $\overline{RAS}$, $\overline{CAS}$, $\overline{WE}$ and $\overline{DT}$ signals to supply those through the lines 604-607 to the dual-port memory 600.

Now, the data reading from the dual-port memory 600 will be explained. The SC (Serial Clock) signal on the line 112 connected with the read timing signal generator 110 is input to the second latch 120 thereby to latch the data read from the dual-port memory 600 so as to convert this into the "m" bit read data. Latched data converted into the format conforming with the corresponding bit in the first, second and third digital/analog converter 700, 800 and 900. For this purpose, firstly after data is converted in the data spectrum and data controller 130, the Y (K bits), R−Y (K bits) and B−Y (K bits) are transmitted to the first, second and third digital/analog converter 700, 800 and 900, thereby to be converted into the analog signals Y, R−Y and B−Y respectively by the D/A clock on line 508. The signals from the first, second and third digital/analog converters 700, 800 and 900 are input to the color encoder 1000, and in the color encoder 1000, the main picture video signal on line 1001, and the sub-picture component and the PCLMP, YS and BFP signals through the lines 509, 510 and BFP are composed so that the composite video outputs of new multiple pictures are produced.

As described above, according to the present invention, there are advantages of the invention which make it easy to customize the construction of such embodiments in a TTL circuit which, can process the multiple pictures having different picture sources to a user's taste for TV and VTR and can reduce the production cost by simplification of the construction.

The foregoing description shows only a preferred embodiment of the present invention. Various modifications are apparent to those skilled in the art without departing from the scope of the present invention which is only limited by the appended claims. Therefore, the embodiment shown and described is illustrative only, and not restrictive.

What is claimed is:

1. A picture signal processing circuit for producing multiple pictures simultaneously on a display screen of an appliance provided with a synchronizing signal separator and oscillator, said circuit comprising:

a keyboard or remocon capable of providing an instruction word for a multiple mode established by a user;

a microcomputer for checking the instruction word input through said keyboard or remocon, producing first clock signals and first data for processing multiple pictures, and recognizing whether said first data is effective on the basis of second data received through a strobe line;

a controller coupled to receive vertical and horizontal synchronizing signals for a main picture and sub-pictures for a video signal and to receive a first and a second reference frequency, to thereby control the displaying of the multiple pictures on the display screen in dependence upon the first data from said microcomputer;

analog switching device means, for providing output data by selecting and inputting luminance signals Y and color difference signals B−Y and R−Y in a sequence of R−Y, Y, Y, B−Y, Y, Y in response to switching signals for selecting said luminance signal and color difference signals from the controller;

analog/digital converter means for converting output data of the analog switching device means into digital data on a basis of a second clock signal from the controller;

a dual-port memory provided with two access ports of input/output terminals bidirectionally accessible independently from each other of said ports, to conduct $\overline{DT}$, $\overline{CAS}$, $\overline{RAS}$, $\overline{WE}$ and SC signals between corresponding ports of the controller in response to the vertical and horizontal synchronizing signals for the main picture and sub-pictures, to receive address signals, to store and read the digital data via the access ports in accordance with a designation of windows for multiple pictures, and output corresponding video data via a serial port in response to a first control signal from a random port of said controller;

first, second and third digital-to-analog converting means for dividing the video data from said dual-port memory into the luminance signals and the color difference access signals in accordance with digital-to-analog conversion sampling signals produced by said controller, thereby converting the digital data into analog signals; and color encoder means for encoding analog signals produced by said first, second and third digital-to-analog converting means with a main picture video signal, on a basis of sub-picture position determining signals and pedestal clamping signals of a composite synchronizing signal from said controller, to thereafter enable a multiple picture video display.

2. The picture signal processing circuit, as set forth in claim 1, wherein the controller comprises:

command decoder means connected with said microcomputer for decoding data output from said microcomputer to make determinations of whether said data output is a multiple picture selecting signal, and thereby producing selection control signals for performing read/write functions according to said determinations;

writing controller means connected with said command decoder for producing writing control signals in response to the selection control signals produced from the command decoder means and sub-picture vertical and horizontal synchronizing signals;

writing timing signal generator means coupled to receive said writing control signals, for determining a desired number of sub-pictures and for receiving a first reference signal and said sub-picture vertical and horizontal synchronizing signals, for generating column and row refresh clock signals and switching signals, for generating sampling clock signals for converting the luminance and color difference signals into said digital data, for generating data converting clock signals for converting said digital data into "n" bit data and a second clock signal for latching the digital data, and for generating timing clock signals for writing the sub-picture data;

first latch means for latching the digital data from the analog-to-digital converter means on a basis of said second clock signal;

data converter means for converting into the digital data into "n" bit data suitable for processing characteristics of said dual-port memory in dependence upon the data converting clock signals;

writing address signal generator means coupled to receive said sub-picture vertical/horizontal synchronizing signals and the writing control signals, for generating the column and row signals for writing the digital data and thereafter address signals for refreshing the memory in dependence upon the column and row refresh clock signals;

multiplexer means for selecting the column and row address signals and an address signal for memory refreshing output from said writing address signal generator on a basis of control signals produced from said writing timing signal generator, to select a memory refreshing address, an image data writing signal and output address signals for processing multiple pictures in said dual-port memory;

memory timing generator means for generating the $\overline{DT}$, $\overline{CAS}$, $\overline{RAS}$, $\overline{WE}$ control signals in response to the timing clock and the control signal;

reading controller means coupled to receive the address signals for choosing the memory area from said writing address signal generator means, and to receive from said command decoder means read control signals indicating that picture information exists in said dual-port memory, for producing reading control signals on a basis of the main picture vertical synchronizing signal;

reading timing signal generator means coupled to receive the first reference signal, the main picture horizontal synchronizing signal and position information of identifying signals produced by said reading controller means to respond to said main picture horizontal synchronizing signal and position information signal, and to thereafter generate third clock signals, said window control signal and burst frequency pulse signal;

reading address signal generator means for using the position information representing positions of sub-pictures with said main picture, the main picture horizontal synchronizing signal, and an enabling signal initiating read-out, for responding to said input signals and thereby generating address signals for reading the digital data;

second latch means for latching digital data from said dual-port memory on a basis of said third clock signals; and data spectrum and data controller means for converting the digital data from said second latch means into a format corresponding to the order of B−Y, R−Y and Y under control of said reading timing signal generator means.

3. A picture signal processing circuit for producing multiple pictures simultaneously on a display screen associated with an appliance provided with a synchronizing signal separator and oscillator, said circuit comprising:

a keyboard or remote controller capable of inputting an instruction word representing a multiple picture mode established by a user;

a microcomputer which checks the instruction word for processing the multiple picture mode input through said keyboard or remote controller, produces clock and pulse data for processing the multiple pictures, and recognizes whether said clock and pulse data is effective on a basis of second data received through a strobe line;

a controller coupled to receive vertical and horizontal synchronizing signals of a main picture and sub-pictures from the synchronizing signal separator for a video signal and to receive a first and a second reference frequency produced in the oscillator, to thereby control the display of multiple pictures on a monitor with picture selection data from said microcomputer;

analog switching device means for selecting a luminance signal Y and color difference signals B−Y and R−Y in a sequence R−Y, Y, Y, B−Y, Y, Y by means of switching signals from the controller;

an analog-to-digital converter for converting the luminance signal and color difference signals from the analog switching device into digital data in response to sampling clock signals from the controller to the analog-to-digital converter;

a dual-port memory provided with two ports of input/output terminals each of said two ports being bidirectionally accessible independently of each other, said memory being coupled to receive $\overline{DT}$, $\overline{CAS}$, $\overline{RAS}$, $\overline{WE}$ and SC signals from the controller in response to the main picture and sub-picture vertical and horizontal synchronizing signal, stores and reads the digital data from said analog-to-digital converter through the access ports in accordance with window signals designating sub-pictures for display upon said main picture, and outputs corresponding video data to a serial port in response to a control signal from said controller;

first, second and third digital-to-analog converters for dividing the video data from said dual-port memory into luminance signal and color difference signals in accordance with digital-to-analog conversion sampling signals produced by said controller, thereby converting the video data into analog signals; and color encoder means for encoding, by a sub-picture position determining signal and a pedestal clamping signal of a composite synchronizing signal output from said controller, an array said analog signals produced in said first, second and third digital-to-analog converters with a main picture video signal, thereafter to provide video signals for a display in a form of a multiple picture with sub-pictures within said main picture.

4. A picture signal processing circuit according to claim 3, wherein the controller comprises:

a command decoder connected with said microcomputer to decode data output from said microcomputer and to perform a determination of whether said decoded data output is a multiple picture selecting signal, and to thereby produce a control signal for performing a read/write function according to said determination;

a writing controller connected with said command decoder to produce a writing control signal in response to picture selecting information produced from the command decoder and the sub-picture vertical and horizontal synchronizing signals;

a writing timing signal generator using a picture producing timing control signal from said writing controller for determining a number of pictures to be displayed, and using a first reference signal and the sub-picture vertical and horizontal synchronizing signals, thereby to generate column refresh clock signals for said dual-port memory and the luminance Y and color difference signals B−Y, R−Y, generate sampling clock signals for enabling said analog-to-digital converter to convert the analog signal into digital data, generate a timing clock signal, generate a converting clock signal for enabling conversion of said digital data from said analog-to-digital converter into "m" bit data for storage in said dual-port memory, and generate other clock signals for enabling writing of the digital data for sub-pictures;

a first latch means for latching the digital data in response to said timing clock signal from said writing timing signal generator;

a data converter for converting the digital data into the corresponding "m" bit data for the dual-port memory in accordance with said converting clock signal from said writing timing signal generator;

a writing address signal generator using said sub-picture vertical and horizontal synchronizing signal and a control signal output from said write controller, and using column and refresh clocks produced by the writing timing signal generator, to thereby generate column and row signals for writing image data and thereafter generate address signals for refreshing the memory;

a multiplexor for selecting column and row address signals and the address signals for memory refreshing output from said writing address signal generator by control signals produced from said writing timing signal generator, to thereby to select memory refreshing addresses, image data writing signals and transmitting address signals for processing multiple pictures in said dual-port memory;

a memory timing generator for generating the $\overline{DT}$, $\overline{CAS}$, $\overline{RAS}$ and $\overline{WE}$ control signals for said dual-port memory in response to a timing clock for memory and a control signal for memory processing generated in said writing timing signal generator;

a reading controller coupled to receive the address signals for selecting memory area from said writing address signal generator, and to receive from said command decoder a read control signal indicating that the picture information exists in said dual-port memory, and to thereby to produce a reading control signal in response to the vertical synchronizing signal of the main picture;

a reading timing signal generator coupled to receive the first reference signal ($a = f_{sc}$) ($a > 0$), and input the main picture horizontal synchronizing signal and a position information identifying signal produced from said reading controller, and thereafter to generate a clock signal for enabling the digital-to-analog conversion, a window control signal and burst frequency pulse signal in dependence upon said first reference signal, main picture horizontal synchronizing signal and position, information, identify signal;

a reading address signal generator using the position information identifying signal representing the position of a small picture for picture-in-picture representations to be displayed through a line connected with said reading timing signal generator, and the main picture vertical synchronizing signal, and using an enabling signal from the reading controller to respond to input signals, thereby generating the address signal for reading the image data;

a second latch means for latching data output from said dual-port memory by a signal output from said reading timing signal generator; and a data spectrum and data controller for converting the data output from said second latch means into a format corresponding to B−Y, R−Y and Y, according to the output produced from said reading timing signal generator.

5. A picture signal processing circuit for producing multiple pictures simultaneously on a display screen of an appliance provided with a synchronizing signal separator and oscillator, said circuit comprising:

processing means for checking an instruction word established by a user for simultaneous display of multiple video pictures on a display, producing first clock signals and first data for processing multiple video pictures, and recognizing whether said first data is effective on the basis of second data;

means for controlling said simultaneous display of the multiple video pictures on the display screen in dependence upon the first data, vertical and horizontal synchronizing signals for main pictures and sub-pictures for a video signal and a first and a second reference frequency;

analog-to-digital converter means, for providing digital data by selecting and converting luminance signals and color difference signals in response to switching and second clock signals for selecting said luminance signals and color difference signals;

a dual-port memory provided with two access ports of input/output terminals each being independently bidirectionally accessible, to conduct signals $\overline{DT}$, $\overline{CAS}$, $\overline{RAS}$, $\overline{WE}$ and SC signals between corresponding ports of the controlling means in response to the vertical and horizontal synchronizing signals for the main pictures and sub-pictures, to receive address signals, to store and read the digital data via the access ports in accordance with a designation of windows for multiple pictures, and output corresponding video data in response to a first control signal from said controller;

digital-to-analog converting means for converting the video data from said dual-port memory into analog signals; and color encoder means for encoding the analog signals on a basis of sub-picture position determining signals and pedestal clamping signals of a composite synchronizing signal to thereafter enable a multiple picture video display including one or more of said sub-pictures superimposed upon said main picture.

6. The picture signal processing circuit, as set forth in claim 5, wherein the controller comprises:

command decoder means connected with said processing means, for decoding data output from said processing means to make determinations of whether data output is a multiple picture selecting signal, and thereby producing selection control signals for performing read/write functions according to said determinations;

writing controller means connected with said command decoder means for producing writing control signals in response to the selection control signals produced from the command decoder means and sub-picture vertical/horizontal synchronizing signals; and writing timing signal generator means coupled to receive said writing control signals, for determining a desired number of sub-pictures to be displayed, for receiving a first reference signal and sub-picture vertical/horizontal synchronizing signals, and for generating sampling clock signals for converting luminance and color difference signals.

7. A picture signal processing circuit for producing multiple pictures simultaneously on a single display screen of an appliance provided with a synchronizing signal separator and oscillator, said circuit comprising:

means for controlling simultaneous display of the multiple video pictures of a main picture and one or more sub-pictures on the single display screen in dependence upon reception of multiple-picture selection data initiated by a user to provide a designation of windows for sub-pictures within said single display, and for generating switching signals for selecting luminance signals and color difference signals from received video signals corresponding to respective ones of said sub-pictures, generating analog-to-digital conversion clock signals and digital-to-analog conversion clock signals, generating sub-picture position determining signals and pedestal clamping signals, and generating data transfer, column address, row address, write enable, and serial clock signals in dependence upon vertical and horizontal synchronizing signals of received video signals for the main picture and the sub-pictures, and first and second reference frequency signals;

analog-to-digital converting means, for providing video data by selecting in a prescribed sequence and converting, said luminance signals and color difference signals of said received video signals corresponding to said respective sub-pictures, in dependence upon said switching signals and analog-to-digital conversion clock signals;

a dual-port memory provided with two access ports of input/output terminals each being independently bidirectionally accessible for storing said video data via the access ports in dependence upon said data transfer, column address, row address, write enable, and serial clock signals;

digital-to-analog converting means for converting the video data from said dual-port memory into analog signals in dependence upon said digital-to-analog conversion clock signals; and color encoder means, for encoding the analog signals with said received video signals for said main picture video signal on a basis of said sub-picture position determining signals and pedestal clamping signals to thereafter provide a composite video signal to enable a multiple picture video display including one or more of said sub-pictures superimposed upon said main picture.

8. The picture signal processing circuit, as set forth in claim 7, wherein the controlling means comprises:

command decoding means for receiving and decoding said multiple-picture selection data to make determinations of whether said multiple-picture selection data is a multiple picture selecting signal, and for producing selection control signals to enable reading and writing of said video data according to said determinations;

reading controlling means connected with said command decoder for producing reading control signals in response to the selection control signals, said main picture vertical synchronizing signals and writing column and row address signals of locations of said video data within said memory;

reading timing signal generating means for generating said serial clock signals, digital-to-analog conversion clock signals, sub-picture position determining signals and pedestal clamping signals in response to said first reference signal, said reading control signals and said main picture vertical and horizontal synchronizing signals; and reading address signal generating means for generating reading column and row address signals of locations for said video data within said memory, in dependence upon said reading control signals and said main picture vertical and horizontal synchronizing signals.

9. The picture signal processing circuit, as set forth in claim 8, wherein the controlling means further comprises:

means for addressing selected locations of said memory in dependence upon said control signals and said reading column and row address signals to said memory; and memory timing means for generating said data transfer, column address, row address, and write enable signals in dependence upon said memory timing clock signals and control signals.

10. The picture signal processing circuit, as set forth in claim 8, wherein said controlling means further comprises:

said reading timing signal generating means generating enabling signals; and spectrum controller means for converting said luminance and color difference signals into a prescribed format in response to said enabling signals.

11. The picture signal processing circuit, as set forth in claim 7, wherein the controlling means comprises:

command decoding means for receiving and decoding said multiple-picture selection data to make determinations of whether said multiple-picture selection data is a multiple picture selecting signal, and for producing selection control signals to enable reading and writing of said video data according to said determinations;

writing controlling means connected with said command decoder for producing writing control signals in response to the selection control signals produced from the command decoding means and sub-picture vertical and horizontal synchronizing signals;

writing timing signal generating means coupled to receive said writing control signals, for generating said switching signals and said analog-to-digital conversion clock signals, for generating column and row refresh signals, and for generating memory timing clock signals and control signals, in response to said second reference signal, said sub-picture vertical and horizontal synchronizing signals and said vertical synchronizing signals; and writing address signal generating means for generating writing column and row address signals of locations for said video data within said memory, in response to said sub-picture vertical and horizontal synchronizing signals.

12. The picture signal processing circuit, as set forth in claim 11, wherein the controlling means further comprises:

reading controlling means connected with said command decoder for producing reading control signals in response to the selection control signals, said main picture vertical synchronizing signals, and said writing column and row address signals of locations of said video data within said memory;

reading timing signal generating means for generating said serial clock signals, digital-to-analog conversion clock signals, sub-picture position determining signals and pedestal clamping signals in response to said first reference signal, said reading control signals and said main picture vertical and horizontal synchronizing signals; and reading address signal generating means for generating reading column and row address signals of locations for said video data within said memory, in dependence upon said reading control signals and said main picture vertical and horizontal synchronizing signals.

13. The picture signal processing circuit, as set forth in claim 11, wherein the controlling means further comprises:

means for addressing selected locations of said memory in dependence upon said control signals and said writing column and row address signals to said memory; and memory timing means for generating said data transfer, column address, row address, and write enable signals in dependence upon said memory timing clock signals and control signals.

14. The picture signal processing circuit, as set forth in claim 11, wherein said controlling means further comprises:

said writing timing signal generating means generating data converting clock signals; and means disposed between said analog-to-digital converting means and memory, for receiving and converting said video data from said analog-to-digital converting means into a format for storage within said memory means, in dependence upon said data converting clock signals.

15. The picture signal processing circuit, as set forth in claim 12, wherein said controlling means further comprises:

said reading timing signal generating means generating enabling signals; and spectrum controller means for converting said luminance and color difference signals into a prescribed format in response to said enabling signals.

16. The picture signal processing circuit, as set forth in claim 12, wherein the controlling means further comprises:

means for addressing selected locations of said memory in dependence upon said control signals and selected ones of said writing column and row address signals and reading column and row address signals; and memory timing means for generating said data transfer, column address, row address, and write enable signals in dependence upon said memory timing clock signals and control signals.

17. The picture signal processing circuit, as set forth in claim 16, wherein said controlling means further comprises:

said writing timing signal generating means generating data converting clock signals; and said reading timing signal generating means generating enabling signals;

means disposed between said analog-to-digital converting means and memory, for receiving and converting said video data from said analog-to-digital converting means into a format for storage within said memory means, in dependence upon said data converting clock signals; and spectrum controller means for converting said luminance and color difference signals into a prescribed format in response to said enabling signals.

18. The picture signal processing circuit, as set forth in claim 12, wherein said controlling means further comprises:

said writing timing signal generating means generating data converting clock signals; and means disposed between said analog-to-digital converting means and memory, for receiving and converting said video data from said analog-to-digital converting means into a format for storage within said memory means, in dependence upon said data converting clock signals.

19. The picture signal processing circuit, as set forth in claim 18, wherein said controlling means further comprises:

said reading timing signal generating means generating enabling signals; and spectrum controller means for converting said luminance and color difference signals into a prescribed format in response to said enabling signals.

20. The picture signal processing circuit, as set forth in claim 7, wherein the controlling means comprises:

command decoding means for receiving and decoding said multiple-picture selection data to make determinations of whether said multiple-picture selection data is a multiple picture selecting signal, and for producing selection control signals to enable reading and writing of said video data according to said determinations;

writing controlling means connected with said command decoder for producing writing control signals in response to the selection control signals produced from the command decoding means and sub-picture vertical and horizontal synchronizing signals;

writing timing signal generating means coupled to receive said writing control signals, for generating said switching signals and said analog-to-digital conversion clock signals, for generating column and row refresh signals, and for generating memory timing clock signals and control signals, in response to said second reference signal, said sub-picture vertical and horizontal synchronizing signals and said vertical synchronizing signals; and writing address signal generating means for generating writing column and row address signals of locations for said video data within said memory and refresh column and row address signals of locations within said memory, in response to said sub-picture vertical and horizontal synchronizing signals.

21. The picture signal processing circuit, as set forth in claim 20, wherein the controlling means further comprises:

reading controlling means for producing reading control signals in response to the selection control signals, said main picture vertical synchronizing signals, and said writing column and row address signals of locations for said video data within said memory;

reading timing signal generating means for generating said serial clock signals, digital-to-analog conversion clock signals, refresh address signals, sub-picture position determining signals and pedestal clamping signals in response to said first reference signal, said reading control signals and said main picture vertical and horizontal synchronizing signals; and reading address signal generating means for generating reading column and row address signals of locations for said video data within said memory, in dependence upon said reading control signals and said main picture vertical and horizontal synchronizing signals.

22. The picture signal processing circuit, as set forth in claim 21, wherein the controlling means further comprises:

means for addressing selected locations of said memory in dependence upon said control signals and selected ones of said writing column and row address signals, reading column and row address signals, and refresh address signals; and memory timing means for generating said data transfer, column address, row address, and write enable signals in dependence upon said refresh address signals, memory timing clock signals and control signals.

23. The picture signal processing circuit, as set forth in claim 21, wherein said controlling means further comprises:

said writing timing signal generating means generating data converting clock signals; and said reading timing signal generating means generating enabling signals;

means disposed between said analog-to-digital converting means and memory, for receiving and converting said video data from said analog-to-digital converting means into a format for storage within said memory means, in dependece upon said data converting clock signals; and spectrum controller means for converting said luminance and color difference signals into a prescribed format in response to said enabling signals.

24. The picture signal processing circuit, as set forth in claim 22, wherein said controlling means further comprises:

said writing timing signal generating means generating data converting clock signals; and said reading timing signal generating means generating enabling signals;

means disposed between said analog-to-digital converting means and memory, for receiving and converting said video data from said analog-to-digital converting means into a format for storage within said memory means, in dependence upon said data converting clock signals; and spectrum controller means for converting said luminance and color difference signals into a prescribed format in response to said enabling signals.

25. A picture signal processing circuit for producing multiple pictures simultaneously on a signal display screen of an appliance provided with a synchronizing signal separator and oscillator, said circuit comprising:

means for controlling simultaneous display of the multiple video pictures of a main picture and one or more sub-pictures on the single display screen in a dependence upon reception of multiple-picture selection data initiated by a user to provide a designation of windows for sub-picture within said single display, an for generating switching signals for selecting luminance signals and color difference signals from received video signals corresponding to respective ones of said sub-pictures, generating sub-picture position determining signals and pedestal clamping signals, and generating data transfer, column address, row address, write enable, and serial clock signals in dependence upon vertical and horizontal synchronizing signals of said received video signals for the main picture and the sub-pictures, and first and second reference frequency signals;

means for providing video data by selecting in a prescribed sequence, said luminance signals and color difference signals of said received video signals corresponding to said respective sub-pictures, in dependence upon said switching signals;

a dual-port memory provided with two access ports of input/output terminals each being independently bidirectionally accessible for storing said video data via the access ports in dependence upon said data transfer, column address, row address, write enable, and serial clock signals; and color encoder means, for encoding the video data from said dual-port memory signals for said main picture video signal on a basis of said sub-picture position determining signals and pedestal clamping signals to thereafter provide a composite video signal to enable a multiple picture video display including one or more of said sub-pictures superimposed upon said main picture.

26. The picture signal processing circuit, as set forth in claim 25, wherein the controlling means comprises:

command decoding means for receiving and decoding said multiple-picture selection data to make determinations of whether said multiple-picture selection data is a multiple picture selecting signal, and for producing selection control signals to enable reading and writing of said video data according to said determinations;

reading controlling means connected with said command decoder for producing reading control signals in response to the selection control signals, said main picture vertical synchronizing signals and writing column and row address signals of locations of said video data within said memory;

reading timing signal generating means for generating said serial clock signals, sub-picture position determining signals and pedestal clamping signals in response to said first reference signal, said reading control signals and said main picture vertical and horizontal synchronizing signals; and reading address signal generating means for generating reading column and row address signals of locations for said video data within said memory, in dependence upon said reading control signals and said main picture vertical and horizontal synchronizing signals.

27. The picture signal processing circuit, as set forth in claim 26, wherein the controlling means further comprises:

means for addressing selected locations of said memory in dependence upon said control signals and said reading column and row address signals to said memory; and memory timing means for generating said data transfer, column address, row address, and write enable signals in dependence upon said memory timing clock signals and control signals.

28. The picture signal processing circuit, as set forth in claim 26, wherein said controlling means further comprises:

said reading timing signal generating means generating enabling signals; and spectrum controller means for converting said luminance and color difference signals into a prescribed format in response to said enabling signals.

29. The picture signal processing circuit, as set forth in claim 25, wherein the controlling means comprises:

command decoding means for receiving and decoding said multiple-picture selection data to make determinations of whether said multiple-picture selection data is a multiple picture selecting signal, and or producing selection control signals to enable reading and writing of said video data according to said determinations;

writing controlling means connected with said command decode for producing writing control signals in response to the selection control signals produced from the command decoding means and sub-picture vertical and horizontal synchronizing signals;

writing timing signal generating means coupled to receive said writing control signals, for generating said switching signals, for generating column and row refresh signals, and for generating memory timing clock signals and control signals, in response to said control reference signal, said sub-picture vertical and horizontal synchronizing signals and said vertical synchronizing signals; and writing address signal generating means for generating writing column and row address signals of locations for said video data within said memory, in response to said sub-picture vertical and horizontal synchronizing signals.

30. The picture signal processing circuit, as set forth in claim 29, wherein the controlling means further comprises:

reading controlling means connected with said command decoder for producing reading control signals in response to the selection control signals, said main picture vertical synchronizing signals, and said writing column and row address signals of locations of said video data within said memory;

reading timing signal generating means for generating said serial clock signals, sub-picture position determining signals and pedestal clamping signals in response to said first reference signal, said reading control signals and said main picture vertical and horizontal synchronizing signals; and reading address signal generating means for generating reading column and row address signals of locations for said video data within said memory, in dependence upon said reading control signals and said main picture vertical and horizontal synchronizing signals.

31. The picture signal processing circuit, as set forth in claim 29, wherein the controlling means further comprises:

means for addressing selected locations of said memory in dependence upon said control signals and said writing column and row address signals to said memory; and memory timing means for generating said data transfer, column address, row address, and write enable signals in dependence upon said memory timing clock signals and control signals.

32. The picture signal processing circuit, as set forth in claim 29, wherein said controlling means further comprises:
said writing timing signal generating means generating data converting clock signals; and
means for receiving and converting said video data into a format for storage within said memory means, in dependence upon said data converting clock signals.

33. The picture signal processing circuit, as set forth in claim 30, wherein said controlling means further comprises:
said reading timing signal generating means generating enabling signals; and
spectrum controller means for converting said luminance and color difference signals into a prescribed format in response to said enabling signals.

34. The picture signal processing circuit, as set forth in claim 30, wherein the controlling means further comprises:
means for addressing selected locations of said memory in dependence upon said control signals and selected ones of said writing column and row address signals and reading column and row address signals; and
memory timing means for generating said data transfer, column address, row address, and write enable signals in dependence upon said memory timing clock signals and control signals.

35. The picture signal processing circuit, as set forth in claim 34, wherein said controlling means further comprises:
said writing timing signal generating means generating data converting clock signals; and
said reading timing signal generating means generating enabling signals;
means for receiving and converting said video data into a format for storage within said memory means, in dependence upon said data converting clock signals; and
spectrum controller means for converting said luminance and color difference signals into a prescribed format in response to said enabling signals.

36. The picture signal processing circuit, as set forth in claim 30, wherein said controlling means further comprises:
said writing timing signal generating means generating data converting clock signals; and
means disposed between said analog-to-digital converting means and memory, for receiving and converting said video data from said analog-to-digital converting means into a format for storage within said memory means, in dependence upon said data converting clock signals.

37. The picture signal processing circuit, as set forth in claim 36, wherein said controlling means further comprises:
said reading timing signal generating means generating enabling signals; and
spectrum controller means for converting said luminance and color difference signals into a prescribed format in response to said enabling signals.

38. The picture signal processing circuit, as set forth in claim 25, wherein the controlling means comprises:
command decoding means for receiving and decoding said multiple-picture selection data to make determinations of whether said multiple-picture selection data is a multiple picture selecting signal, and for producing selection control signals to enable reading and writing of said video data according to said determinations;
writing controlling means connected with said command decoder for producing writing control signals in response to the selection control signals produced from the command decoding means and sub-picture vertical and horizontal synchronizing signals;
writing timing signal generating means coupled to receive said writing control signals, for generating said switching signals, for generating column and row refresh signals, and for generating memory timing clock signals and control signals, in response to said second reference signal, said sub-picture vertical and horizontal synchronizing signals and said vertical synchronizing signals; and
writing address signal generating means for generating writing column and row address signals of locations for said video data within said memory and refresh column and row address signals of locations within said memory, in response to said sub-picture vertical and horizontal synchronizing signals.

39. The picture signal processing circuit, as set forth in claim 38, wherein the controlling means further comprises:
reading controlling means for producing reading control signals in response to the selection control signals, said main picture vertical synchronizing signals, and said writing column and row address signals of locations for said video data within said memory;
reading timing signal generating means for generating said serial clock signals, refresh address signals, sub-picture position determining signals and pedestal clamping signals in response to said first reference signal, said reading control signals and said main picture vertical and horizontal synchronizing signals; and
reading address signal generating means for generating reading column and row address signals of locations for said video data within said memory, in dependence upon said reading control signals and said main picture vertical and horizontal synchronizing signals.

40. The picture signal processing circuit, as set forth in claim 39, wherein the controlling means further comprises:
means for addressing selected locations of said memory in dependence upon said control signals and selected ones of said writing column and row address signals, reading column and row address signals, and refresh address signals; and
memory timing means for generating said data transfer, column address, row address, and write enable signals in dependence upon said refresh address signals, memory timing clock signals and control signals.

41. The picture signal processing circuit, as set forth in claim 39, wherein said controlling means further comprises:
said writing timing signal generating means generating data converting clock signals; and
said reading timing signal generating means generating enabling signals;

means for receiving and converting said video data into a format for storage within said memory means, in dependence upon said data converting clock signals; and spectrum controller means for converting said luminance and color difference signals into a prescribed format in response to said enabling signals.

42. The picture signal processing circuit, as set forth in claim 40, wherein said controlling means further comprises:

said writing timing signal generating means generating data converting clock signals; and said reading timing signal generating means generating enabling signals;

means for receiving and converting said video data into a format for storage within said memory means, in dependence upon said data converting clock signals; and spectrum controller means for converting said luminance and color difference signals into a prescribed format in response to said enabling signals.

43. The picture signal processing circuit, as set forth in claim 25, further comprising:

said controlling means generating digital-to-analog conversion clock signals; and digital-to-analog converting means for converting digital video data from said dual-port memory into analog video data, in dependence upon said digital-to-analog conversion clock signals.

44. The picture signal processing circuit, as set forth in claim 25, further comprising:

said controlling means generating analog-to-digital conversion clock signals; and said video data providing means including analog-to-digital converting means, for converting said luminance signals and color difference signals, in dependence upon said analog-to-digital conversion clock signals, to provide said video data.

* * * * *

UNITED STATES PATENT AND TRADEMARK OFFICE
CERTIFICATE OF CORRECTION

PATENT NO. : 5,016,106

DATED : May 14, 1991

INVENTOR(S) : Yong-je KIM, Hoon-Sun CHOI and Dae-Yoon SIM

It is certified that error appears in the above-identified patent and that said Letters Patent is hereby corrected as shown below:

On the title page, under item [19],
 change "Yong-Je et al." to --Kim et al.--;

On the title page, in item [75],
 change "Kim Yong-Je, Kyoungsangnam-do," to --Yong-je Kim, Kyoungsangnam-do,--.

Signed and Sealed this

Fifth Day of January, 1993

*Attest:*

DOUGLAS B. COMER

*Attesting Officer*   *Acting Commissioner of Patents and Trademarks*

UNITED STATES PATENT AND TRADEMARK OFFICE
CERTIFICATE OF CORRECTION

PATENT NO. : 5,016,106
DATED : May 14, 1991
INVENTOR(S) : Yong-Je Kim, et al

It is certified that error appears in the above-indentified patent and that said Letters Patent is hereby corrected as shown below:

On the title page, Abstract line, 11, change "read-write" to —read/write—.

Column 1, line 53, change "each of" to —of each—.

Column 2, line 51, put "quotation mark" around "remocon".

Signed and Sealed this

Twenty-third Day of May, 1995

Attest:

BRUCE LEHMAN

Attesting Officer       Commissioner of Patents and Trademarks